United States Patent
Sabouri-Sichani et al.

(10) Patent No.: US 12,010,628 B2
(45) Date of Patent: Jun. 11, 2024

(54) POWER-EFFICIENT MEASUREMENT REPORTING FOR MULTI/DUAL CONNECTIVITY IN CELLULAR COMMUNICATION NETWORKS

(71) Applicant: Nokia Technologies Oy, Espoo (FI)

(72) Inventors: Faranaz Sabouri-Sichani, Aalborg (DK); Daniela Laselva, Klarup (DK); Mads Lauridsen, Gistrup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 256 days.

(21) Appl. No.: 17/615,121

(22) PCT Filed: Jun. 11, 2019

(86) PCT No.: PCT/EP2019/065164
§ 371 (c)(1),
(2) Date: Nov. 30, 2021

(87) PCT Pub. No.: WO2020/249187
PCT Pub. Date: Dec. 17, 2020

(65) Prior Publication Data
US 2022/0240192 A1    Jul. 28, 2022

(51) Int. Cl.
*H04W 52/14*     (2009.01)
*H04W 24/10*     (2009.01)

(52) U.S. Cl.
CPC ......... *H04W 52/146* (2013.01); *H04W 24/10* (2013.01)

(58) Field of Classification Search
CPC . H04W 52/146; H04W 24/10; H04W 52/242; H04W 52/365; H04W 52/386; H04W 52/34
See application file for complete search history.

(56) References Cited

U.S. PATENT DOCUMENTS

| 2016/0088539 A1* | 3/2016 | Zingler | H04W 74/0833 |
| | | | 455/436 |
| 2018/0077660 A1* | 3/2018 | Ly | H04W 56/001 |
| 2018/0279406 A1* | 9/2018 | Agarwal | H04W 72/23 |

FOREIGN PATENT DOCUMENTS

| WO | 2016/175690 A1 | 11/2016 |
| WO | 2018/203702 A1 | 11/2018 |

OTHER PUBLICATIONS

"New SID: Study on UE Power Saving in NR", 3GPP TSG RAN Meetings #80, RP-181463, Agenda: 9.1.8, CATT, Jun. 11-14, 2018, 5 pages.

(Continued)

*Primary Examiner* — Angelica Perez
(74) *Attorney, Agent, or Firm* — Robert P. Michal, Esq.; Carter, DeLuca & Farrell LLP

(57) ABSTRACT

According to an example aspect of the present invention, there is provided a method for multi-connectivity, the method comprising selecting by a user equipment, based on an uplink transmission power to a first node and an uplink transmission power to at least one second node, a Radio Resource Control, RRC, connection for transmitting measurement reports and transmitting by the user equipment, using the selected RRC connection, a measurement report associated with a transmission of the first node and/or a measurement report associated with a transmission of the at least one second node.

11 Claims, 7 Drawing Sheets

(56) References Cited

OTHER PUBLICATIONS

"3rd Generation Partnership Project; Technical Specification Group Radio Access Network; NR; Study on UE Power Saving (Release 16)", 3GPP TR 38.840, V1.0.0, Mar. 2019, pp. 1-70.

"3rd Generation Partnership Project; Technical Specification Group Radio Access Network; NR; Radio Resource Control (RRC) protocol specification (Release 15)", 3GPP TS 38.331, V15.4.0, Dec. 2018, pp. 1-474.

"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.4.0 , Dec. 2018, pp. 1-67.

"3rd Generation Partnership Project; Technical Specification Group Radio Access Network; Study of Radio Frequency (RF) and Electromagnetic Compatibility (EMC) requirements for Active Antenna Array System (AAS) base station (Release 12)", 3GPP TR 37.840, V12.1.0, Dec. 2013, pp. 1-84.

"3rd Generation Partnership Project; Technical Specification Group Radio Access Network; NR; Physical layer procedures for data (Release 15)", 3GPP TS 38.214, V15.5.0, Mar. 2019, pp. 1-103.

"3rd Generation Partnership Project; Technical Specification Group Radio Access Network; NG-RAN; Xn application protocol (XnAP) (Release 15)", 3GPP TS 38.423, V15.2.0, Dec. 2018, pp. 1-281.

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423, V15.4.0, Dec. 2018, pp. 1-408.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.4.0, Dec. 2018, pp. 1-933.

"3rd Generation Partnership Project; Technical Specification Group Radio Access Network; NR; Physical layer procedures for control (Release 15)", 3GPP TS 38.213, V15.5.0, Mar. 2019, pp. 1-104.

International Search Report and Written Opinion received for corresponding Patent Cooperation Treaty Application No. PCT/EP2019/065164, dated Mar. 20, 2020, 12 pages.

"RRC Signaling with Bearer Splitting Potential", 3GPP TSG RAN WG2 Meeting #84, R2-134108, Agenda: 7.2.2.2, BlackBerry UK Limited, Nov. 11-15, 2013, pp. 1-5.

* cited by examiner

| DRX conf. | PUSCH transmit power | Average power | Power increase(ref. 0 dBm) |
|---|---|---|---|
| 40 ms cycle, 4 ms On Duration | 0 dBm | 18.43 units/slot | 0 % |
| | 15 dBm | 19.39 units/slot | 5.2 % |
| | 23 dBm | 24.64 units/slot | 33.7 % |
| 160 ms, 8 ms On Duration | 0 dBm | 7.83 units/slot | 0 % |
| | 15 dBm | 8.07 units/slot | 3.1 % |
| | 23 dBm | 9.38 units/slot | 19.8 % |

FIGURE 2

POWER-EFFICIENT MEASUREMENT REPORTING FOR MULTI/DUAL CONNECTIVITY IN CELLULAR COMMUNICATION NETWORKS

RELATED APPLICATION

This application claims priority to PCT Application No. PCT/EP2019/065164, filed on Jun. 11, 2019, each of which is incorporated herein by reference in its entirety.

FIELD

Various example embodiments relate in general to cellular communication networks and more specifically, to power-efficient measurement reporting for multi/dual connectivity in such networks.

BACKGROUND

Multi/dual connectivity may be used for improving throughput and mobility by connecting a User Equipment, UE, to a Master Node, MN and at least one Secondary Node, SN, at the same time. Multi/dual connectivity may be used at least in cellular communication networks, such as in networks operating according to Long Term Evolution, LTE, and/or 5G radio access technology. 5G radio access technology may also be referred to as New Radio, NR, access technology. Since its inception, LTE has been widely deployed and 3rd Generation Partnership Project, 3GPP, still develops LTE. Similarly, 3GPP also develops standards for 5G/NR.

On the other hand, UEs typically have limited power and hence saving power of UEs is important as well. Indeed, one of the topics in the 3GPP discussions is reduction of power consumption of UEs for measurement reporting, which is important for multi/dual connectivity use cases as well, and according to the discussions there is a need to provide improved methods, apparatuses and computer programs for power-efficient measurement reporting in cellular communication networks when multi/dual connectivity is used.

SUMMARY

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided a first method for multi-connectivity, the first method comprising selecting by a user equipment, based on an uplink transmission power to a first node and an uplink transmission power to at least one second node, a Radio Resource Control, RRC, connection for transmitting measurement reports and transmitting by the user equipment, using the selected RRC connection, a measurement report associated with a transmission of the first node and/or a measurement report associated with a transmission of the at least one second node.

According to the first aspect, the selecting step may comprise selecting between an RRC connection to the first node and an RRC connection to the at least one second node.

According to the first aspect, the selected RRC connection may comprise at least one Signaling Radio Bearer, SRB.

According to the first aspect, the first method may further comprise calculating the uplink transmission power to the first node, calculating the uplink transmission power to the at least one second node, and wherein the selecting step comprises comparing the calculated uplink transmission power to the first node and the calculated uplink transmission power to the at least one second node.

According to the first aspect, the first method may further comprise determining that the uplink transmission power associated with the selected RRC connection is above a threshold and responsive to the determination, transmitting using the selected RRC connection.

According to the first aspect, the first method may further comprise determining that the uplink transmission power associated with a primary RRC connection is above a threshold and responsive to the determination, selecting the primary RRC connection and transmitting using the primary RRC connection.

According to the first aspect, the first method may further comprise determining that the uplink transmission power to the at least one second node is lower than, or lower by a threshold than, the uplink transmission power to the first node and responsive to the determination, transmitting to the at least one second node the measurement report associated with a transmission of the first node.

According to the first aspect, the first method may further comprise applying a penalty timer, wherein the penalty timer defines a time period during which the selected RRC connection is to be used and upon expiry of the penalty timer, enabling reselection of the RRC connection for transmitting measurement reports.

According to the first aspect, the first method may further comprise determining that the uplink transmission power to the first node is lower, or lower by a threshold, than the uplink transmission power to the at least one second node and responsive to the determination, transmitting to the first node the measurement report associated with a transmission of the at least one second node.

According to the first aspect, the measurement report associated with the transmission of the first node and the measurement report associated with the transmission of the at least one second node may be embedded to a single RRC message by the user equipment.

According to the first aspect, the first node may be a master node and the at least one second node may be a secondary node.

According to a second aspect, there is provided a second method for multi-connectivity, the second method comprising selecting by a first node, based on an uplink transmission power to the first node and an uplink transmission power to at least one second node, a Radio Resource Control, RRC, connection for a user equipment, for transmitting measurement reports and receiving by the first node, using the selected RRC connection, a measurement report associated with a transmission of the first node and/or a measurement report associated with a transmission of the at least one second node.

According to the second aspect, the second method may further comprise transmitting an indication about the selected RRC connection to the user equipment.

According to the second aspect, the selected RRC connection may comprise at least one Signaling Radio Bearer, SRB.

According to the second aspect, the second method may further comprise determining that the uplink transmission power to the first node is lower, or lower by a threshold, than the uplink transmission power to the at least one second node and receiving, by the first node, the measurement report associated with a transmission of the at least one second node.

According to the second aspect, the measurement report associated with a transmission of the first node and the measurement report associated with a transmission of the at least one second node may be in a single RRC message.

According to the second aspect, the second method may further comprise extracting a part of the single RRC message upon receiving the single RRC message, the part comprising the measurement report associated with a transmission of the at least one second node, and forwarding, to the at least one second node, the measurement report associated with a transmission of the at least one second node.

According to the second aspect, the second method may further comprise receiving a RRC message comprising only the measurement report associated with a transmission of the at least one second node and forwarding, to the at least one second node, the measurement report associated with a transmission of the at least one second node.

According to the second aspect, the second method may further comprise receiving, from the at least one second node, an indication about the uplink transmission power to the at least one second node.

According to the second aspect, the first node may be a master node and the at least one second node may be a secondary node.

According to a third aspect of the present invention, there is provided an apparatus comprising at least one processing core, at least one memory including computer program code, the at least one memory and the computer program code being configured to, with the at least one processing core, cause the apparatus at least to perform the first method.

According to a fourth aspect of the present invention, there is provided an apparatus comprising at least one processing core, at least one memory including computer program code, the at least one memory and the computer program code being configured to, with the at least one processing core, cause the apparatus at least to perform the second method.

According to a fifth aspect of the present invention, there is provided an apparatus comprising means for performing the first method. According to a sixth aspect of the present invention, there is provided an apparatus comprising means for performing the second method.

According to a seventh aspect of the present invention, there is provided non-transitory computer readable medium having stored thereon a set of computer readable instructions that, when executed by at least one processor, cause an apparatus to at least perform the first method.

According to an eighth aspect of the present invention, there is provided non-transitory computer readable medium having stored thereon a set of computer readable instructions that, when executed by at least one processor, cause an apparatus to at least perform the second method.

According to a ninth aspect of the present invention, there is provided a computer program configured to perform the first method. According to a tenth aspect of the present invention, there is provided a computer program configured to perform the second method.

BRIEF DESCRIPTION OF THE DRAWINGS

FIG. 2 illustrates estimated power consumption for different PUSCH transmit powers in accordance with at least some embodiments;

EMBODIMENTS

Power consumption in cellular communication networks may be reduced by the procedures described herein. More specifically, embodiments of the present invention enable power-efficient operation of User Equipments, UEs, when multi/dual connectivity is used by selecting one radio link, i.e., Radio Resource Control, RRC, connection that requires the least transmission power for transmitting measurement reports in uplink. The measurement reports may comprise measurement reports related to transmissions of a first node and at least one second node associated with multi/dual connectivity. In some embodiments, the first node may be referred to as a Master Node, MN and the at least one second node may be referred to as a Secondary Node, SN.

Figure 1:
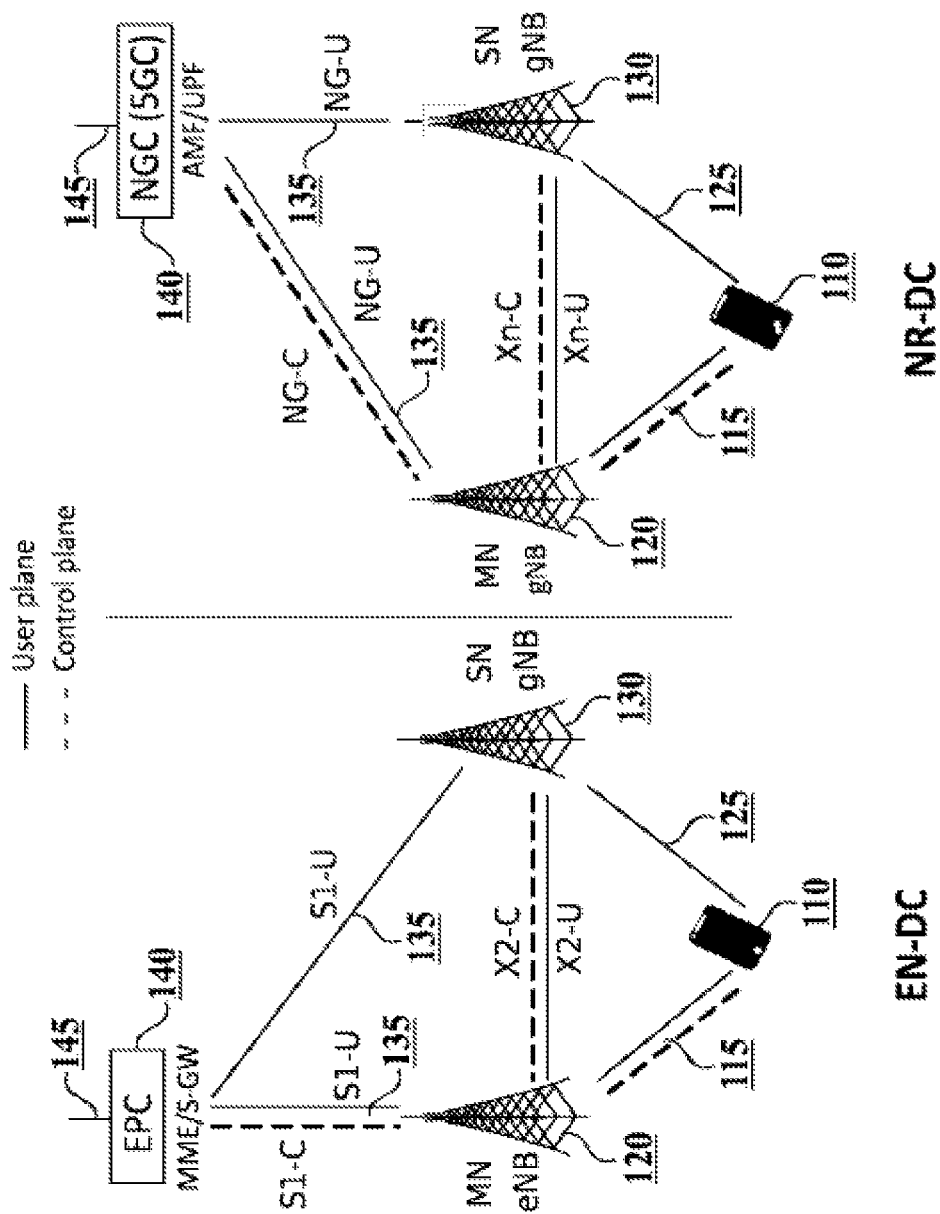
FIG. 1 illustrates exemplary dual connectivity architecture deployment options in accordance with at least some embodiments.

FIG. 1 illustrates exemplary dual connectivity architecture deployment options in accordance with at least some embodiments. Although only two dual connectivity architecture deployment options are shown in FIG. 1, embodiments of the present invention are not limited to those. Instead, embodiments of the present invention may be applied for any suitable dual connectivity deployment option.

Moreover, embodiments of the present invention are also applicable for multi-connectivity as well in general. Multi-connectivity extends dual connectivity by considering simultaneous connections to more than two nodes, i.e., to scenarios comprising at least two SNs. Thus, dual connectivity may be seen as a special case of multi-connectivity. So even though embodiments of the present invention are described using dual connectivity as an example, embodiments of the present invention may be applied in general when there is at least one SN.

According to the exemplary dual connectivity architecture deployment options of FIG. 1, there may be a cellular communication network, which comprises UE 110, MN 120, SN, 130 and core network element(s) 140. MN 120 and SN 130 may comprise, or be associated with, a Base Station, BS. UE 110 may be connected to MN 120 via air interface 115 and to SN 130 via air interface 125 for dual connectivity.

UE 110 may comprise, for example, a smartphone, a cellular phone, a Machine-to-Machine, M2M, node, machine-type communications node, an Internet of Things, IoT, node, a car telemetry unit, a laptop computer, a tablet computer or, indeed, another kind of suitable wireless terminal or mobile station.

Air interface 115 between UE 110 and MN 120 may be configured in accordance with a first Radio Access Technology, RAT, which UE 110 and MN 120 are configured to support, and UE 110 may communicate wirelessly with MN 120 via air interface 115 using the first RAT. Similarly, air interface 125 between UE 110 and SN 130 may be configured in accordance with a second Radio Access Technology, RAT, which UE 110 and SN 130 are configured to support, and UE 110 may communicate wirelessly with SN 130 via air interface 125 using the second RAT.

The first RAT and the second RAT may, or may not, be the same. Examples of cellular RATs include Long Term Evolution, LTE, New Radio, NR, which may also be known as fifth generation, 5G, radio access technology and MulteFire. For instance, in the context of LTE, MN 120 or SN 130 may be referred to as eNB while in the context of NR, MN 120 or SN 130 may be referred to as gNB. In any case, embodiments are not restricted to any particular wireless technology. Instead, embodiments may be exploited in any wireless communication system wherein dual connectivity is used.

MN 120 and SN 130 may be connected, directly or via at least one intermediate node, with core network 140 via wired interfaces 135. Core network 140 may be, in turn, coupled via interface 140 with another network (not shown in FIG. 1), via which connectivity to further networks may be obtained, for example via a worldwide interconnection network. MN 120 and SN 130 may be connected via an inter-base station interface, e.g., X2 or Xn, FIG. 1 illustrates Multi-RAT Dual Connectivity, MR-DC, with Evolved Packet Core, EPC, (EN-DC in FIG. 1) and NR-NR Dual Connectivity (NR-DC in FIG. 1). In MR-DC, in addition to a first Radio Resource Control, RRC, connection towards MN 120, UE 110 may have a second RRC connection towards SN 130. The separation of LTE and NR RRC termination points, or two NR RRC termination points, enables SN 130, depending on network configuration, to trigger e.g. some intra-NR mobility procedures, such as initiating a SN change/release/modification. From the perspective of UE 110, two cell groups may be visible i.e. the Master Cell Group, MCG, and Secondary Cell Group, SCG, and each cell group may contain a primary cell called PCell (i.e., MCG) and PSCell (i.e., SCG) as in legacy DC.

In MR-DC, MN 120 and SN 130 may be capable of operating as independently as possible and, hence, MN 120 cannot be in full control of all DC procedures. For instance, in EN-DC, some procedures may be specific to NR and an LTE MN may not be able to even understand such procedures. Both, MN 120 and SN 130, may have a direct interface with an existing core network, such as core network 140, in the user plane that carries the user data but only MN 120 may have a direct interface towards core network 140 in the control plane that carries the signalling traffic between UE 110 and core network 140.

Thus, MN 120 is in charge for maintaining RRC connection state transitions, handling the connection setup/release, and initiating a first-time SN, i.e., setup of the DC. UE 110 can have only a single RRC state even in DC based on the RRC state of MN 120, and a single control plane connection to core network 140 via MN 120. After establishment of a secondary connection to SN 130, MN 120 and SN 130 may have their own RRC entity which may generate RRC Protocol Data Units, PDUs, to be sent to UE 110. Hence, additional Radio Resource Management, RRM, measurements, such as Reference Signal Received Power, RSRP, and/or Reference Signal Received Quality, RSRQ, may be configured independently by MN 120 or SN 130 on serving frequencies (e.g. for inter-RAT measurement, NR vs. LTE) and by SN 130 (intra-RAT NR measurements on serving and non-serving frequencies).

It should be noted that RRC PDUs generated by SN 130 may also be encapsulated in RRC messages of MN 120 and be transported via MN 120 to UE 110. To allow SN 130, such as a gNB, to alter its radio reconfiguration without involving MN 120, UE 110 may be configured to establish a Signaling Radio Bearer, SRB, (SRB3) to enable RRC PDUs for SN 130 to be sent directly between UE 110 and SN 130. However, SN 130 may use SRB3 only when the radio reconfiguration does not require MN 120 to be involved/informed to ensure that total capability of UE 110 is not exceeded (e.g. in terms of band combinations or total bandwidth). SRB3 may be configured during SN addition and it may carry NR RRC messages, such as Reconfiguration, Reconfiguration Complete and Measurement Report.

Schedulers in MN 120 and SN 130 may be independent from each other and make their own decisions on when and how much data to send or receive from UE 110. This may also apply to RRC and UE 110 may thus have one RRC context to MN 120 and another separate and independent RRC context to SN 130. RRC messages between MN 120, or SN 130, and UE 110 may be transmitted using three different options as described below (e.g., in accordance with 3GPP standard specifications 38.331/37.340):

Option 1: MN 120 may use SRB-1/2 for its RRC messages. NR RRC messages of SN 130 may be exchanged over an X2 or Xn interface with MN 120. MN 120 may then embed the NR RRC message to SRB-1/2 messages and send/receive the NR RRC messages, e.g., over the (Uu) air interface of MN 120.

Option 2: MN 120 may use SRB-1/2 for its LTE RRC messages. SN 130 may, however, decide to establish its own signaling bearer, SRB-3, to communicate with UE 110. There are some operations that may require coordination between MN 120 and SN 130 such as adding new component carriers. In such scenarios, SRB-3 may not be used. Instead, option 1 may be used for such messages to prevent race conditions.

Option 3: MN may establish a Split Bearer for signaling. SRB-1/2 messages and NR RRC messages of SN 130 may be embedded in SRB-1/2 messages and then sent either over air interface of MN 120, Uu air interface of SN 130 or over both simultaneously for improving signaling reliability. In this case, no SRB-3 may be established. This gives MN 120 and/or SN 130 a lot of flexibility when radio conditions change for the better or the worse.

If, or when, UE 110 is in DC with two independent links, UE 110 may determine a transmit power to be used on each link independently based on an uplink power control algorithm and power control commands and parameters (e.g. Po, alpha) provided by a network. Based on that, the uplink transmit power on each link may be largely dependent on a distance between UE 110 and a corresponding MN 120 or SN 130, i.e., path loss between UE 110 and a corresponding MN 120 or SN 130. Hence, a requested power level for uplink transmission may differ by many dBs, such as 10-20 dBs, or even more with high occurrence. Thus, UE may consume a considerable amount of power when transmitting for instance its RRM measurement reports independently to MN 120 and SN 130 over independent links, wherein the independent links may comprise one with a high requested transmit power and another with significantly lower requested transmit power, thereby leading to high power consumption.

It is noted that the power consumption of UE 110 may depend on numerous states, such as Physical Downlink Control Channel, PDCCH, decoding, Physical Uplink Shared Channel, PUSCH, transmission, Discontinuous Reception, DRX-based sleep, and the combinations of those states. However, according to the NR UE power consumption model, as specified in 3GPP standard specification TS 38.840, an uplink transmission on PUSCH/long PUCCH is the most power consuming state, at least in case of high uplink transmit powers.

FIG. 2 illustrates estimated power consumption for different PUSCH transmit powers in accordance with at least some embodiments. In FIG. 2, the impact of power consumption of UE 110 for transmitting data, such as RRM measurement reports, via three links requiring different transmit powers (PUSCH transmit power) is shown. It may be observed that using a 23 dBm link instead of a 0 dBm link increases the average power consumption per slot by 20-30%, depending on the DRX cycle length. The increase from 15 dBm to 23 dBm entails an increase of 15-25%.

A measurement report may be transmitted by UE 110 in PUCCH or PUSCH depending on a use case, e.g., as defined in 3GPP standard specification TS 38.214. Power level of uplink transmissions on PUCCH and PUSCH may be controlled by a network separately through uplink power control. For instance, open-loop configuration for PDSCH and/or Sounding Reference Signal, SRS, e.g., Po, a, may be combined with a path loss estimated by UE 110 may be linked to SRS Resource Indicator, SRI. SRI may indicate a number of configured SRS resources in a SRS resource set, e.g., for a PUSCH beam. Power control configuration for PUCCH may be linked to spatial relation information similarly. Moreover, spatial relation information may define a spatial relation between a Reference Signal, RS, and PUCCH, e.g., as defined in 3GPP standard specification TS 38.213. Nevertheless, based on the one or another power control configuration, a required uplink transmission power may be higher towards MN 120 than SN 130, or vice versa, depending on radio link conditions experienced by UE 110.

Embodiments of the present invention therefore address these issues and enable further power savings for UE 110. More specifically, according to some embodiments, power consumption of UE 110 may be reduced by avoiding signalling of measurement reports of UE 110 via a sub-optimal link when dual connectivity is used. Power consumption of UE 110 may be improved in dual connectivity scenarios, such as MR-DC, by enabling selection of one RRC path, i.e., connection (e.g. SRB1/2 MCG leg, SRB1/2 SCG leg, SRB3), for transmitting measurement reports (e.g., RSRP/RSRQ in RRM measurement reports). The measurement reports may be thus addressed to MN 120 or SN 130 according to required uplink transmission powers.

That is to say, UE 110 may transmit measurement reports intended for MN 120 and SN 130 over one radio link, i.e., RRC connection, which requires the least uplink transmission power, either to MN 120 or SN 130. In some embodiments, a radio link, i.e., an RRC connection, requiring a lowest transmission power may be referred to as a most power efficient link and an air interface used to transmit RRM measurement reports may be referred to as a reporting link. Selection of the most power efficient link, i.e., RRC connection, may be a UE-based decision. For instance, UE 110 may calculate required uplink transmission powers and make the selection itself. Alternatively, UE 110 may rely on a decision of a cellular communication network and determine a most power efficient link based on a received indication about the most power efficient link.

In some embodiments, UE 110 may also attempt to combine measurement reports to both, MN 120 and SN 130, to a same RRC message which is transmitted over the most power efficient link, thereby reducing a number of messages that are needed for transmitting measurement reports.

In some embodiments, a BS that receives a measurement report may not be a final destination of the measurement report, e.g., SN 130 may receive a measurement report associated with a transmission of MN 120. In such a case, the BS that receives the measurement report may forward the measurement report in question to the final destination, for example over a backhaul interface such as X2 or Xn interface.

Figure 3:
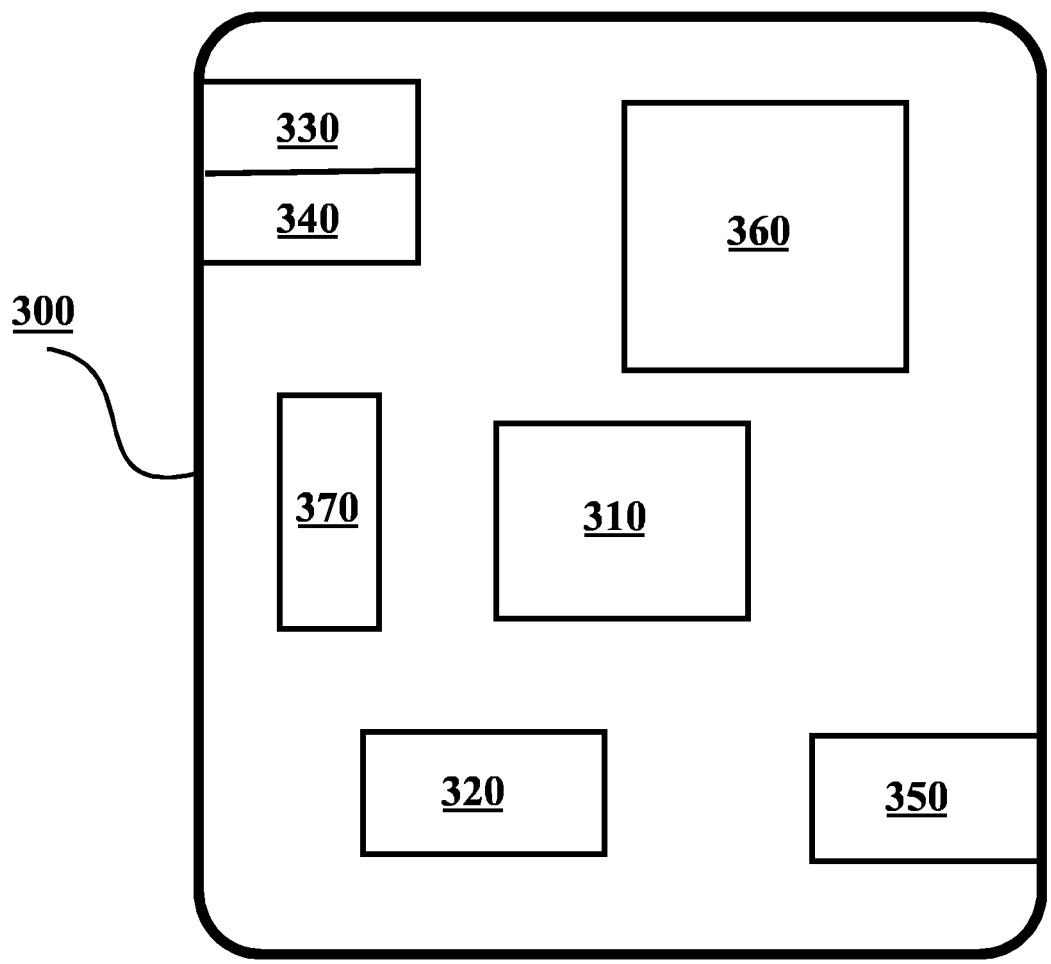
FIG. 3 illustrates an example apparatus capable of supporting at least some embodiments.

FIG. 3 illustrates an example apparatus capable of supporting at least some embodiments. Illustrated is device 300, which may comprise, for example, UE 110, MN 120 or SN 130. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one Application-Specific Integrated Circuit, ASIC. Processor 310 may comprise at least one Field-Programmable Gate Array, FPGA. Processor 310 may be means for performing method steps in device 300. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as UE 110, MN 120 or SN 130, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with Global System for Mobile Communication, GSM, Wideband Code Division Multiple Access, WCDMA, 5G, long term evolution, LTE, IS-95, Wireless Local Area Network, WLAN, Ethernet and/or Worldwide Interoperability for Microwave Access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a Subscriber Identity Module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
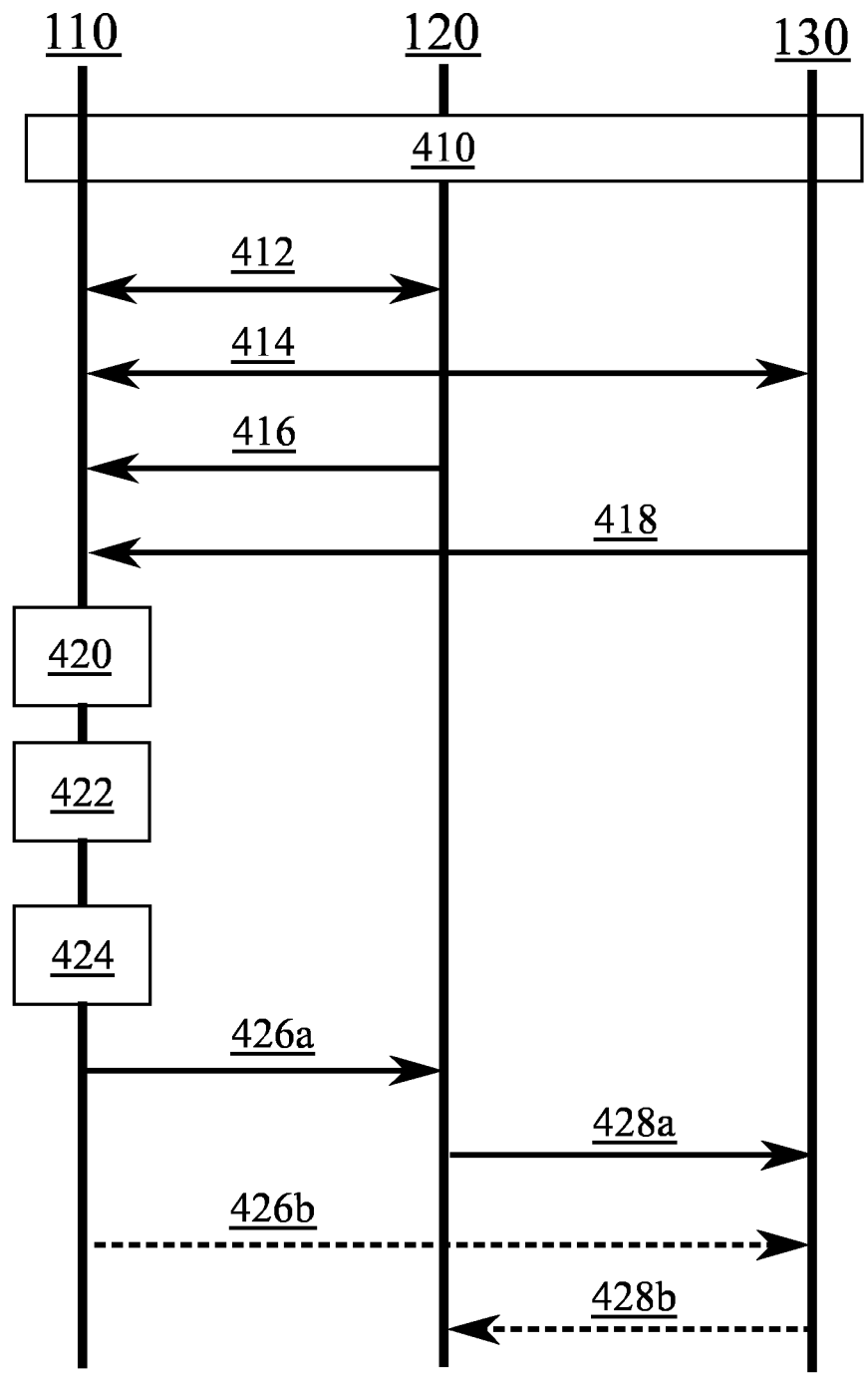
FIG. 4 illustrates signalling in accordance with at least some embodiments.

FIG. 4 illustrates signalling in accordance with at least some embodiments of the present invention. On the vertical axes are disposed, from the left to the right, UE 110, MN 120 and SN 130 of FIG. 1. Time advances from the top towards the bottom.

At step 410, a DC setup may be established between UE 110, MN 120 and SN 130, e.g., with NR as SN 130. At step 412, configuration between UE 110 and MN 120 may be performed for MN measurement control and reports. Similarly, at step 414, configuration between UE 110 and SN 130 may be performed for SN measurement control and reports. That is to say, UE 110 may obtain an RRC connection to MN 120 at step 412 and an RRC connection to SN 130 at step 414. At step 416, uplink power control, e.g., for PUSCH and/or PUCCH, may be performed for transmissions from UE 110 to MN 120. Similarly, at step 418, uplink power control may be performed for transmissions from UE 110 and SN 130.

In case of UE-based selection of the most power efficient link, e.g., for RRM measurement reporting, UE 110 may calculate, at step 420, a required uplink transmission power to MN 120, denoted by $P_{UL,MN}$, and a required uplink transmission power to SN 130, denoted by $P_{UL,SN}$.

At step, 422, UE 110 may compare the calculated uplink transmission power to MN 120, $P_{UL,MN}$, to the calculated uplink transmission power to SN 130, $P_{UL,SN}$. For instance, UE 110 may compare a power level required to transmit over a default configured channel and leg, such as an RRC connection to MN 120, with a potential alternative transmission leg and channel, i.e. PUCCH or PUSCH on the positive alternative leg, such as an RRC connection to SN 130, and select a most power efficient link for transmitting the measurement reports.

Figure 5:
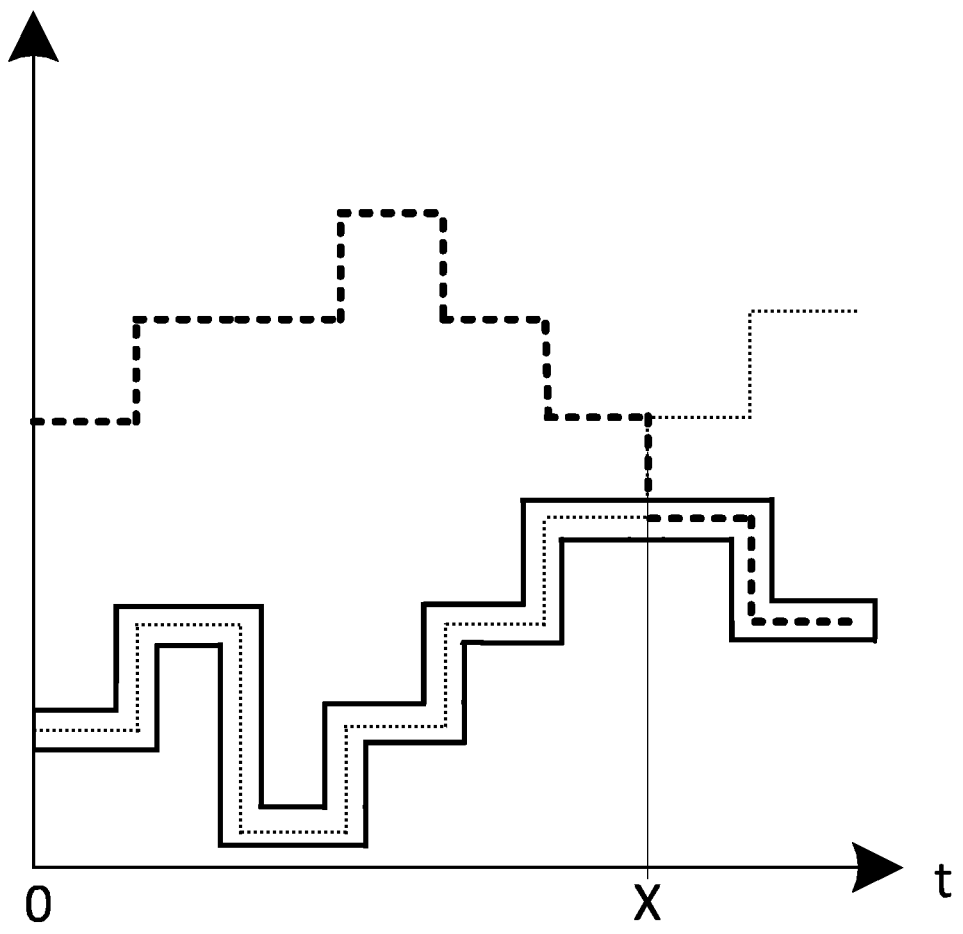
FIG. 5 illustrates selection of a link for transmitting measurement reports in accordance with at least some embodiments.

FIG. 5 illustrates selection of a link for transmitting measurement reports in accordance with some embodiments. For instance, UE 110 may select a link, i.e. RRC connection, to be used for measurement reporting, based on estimated required uplink transmission powers towards MN 120 and SN 130, e.g., for configured PUCCH/PUSCH channels.

In some embodiments, UE 110 may determine that a required uplink transmission power to MN 120 is lower than a required uplink transmission power to SN 130. That is to say, UE 110 may determine that $P_{UL,MN} < P_{UL,SN}$ when $0 < t < X$. In such a case, UE 110 may, responsive to the determination, determine that a measurement report associated with a transmission of MN 120 and a measurement report associated with a transmission of SN 130 should be transmitted to MN 120. However, at time instant t=X UE 110 may determine that $P_{UL,MN}=P_{UL,SN}$ and consequently determine that the measurement report associated with the transmission of MN 120 and the measurement report associated with the transmission of SN 130 should be transmitted to a default BS, such as MN 120 if the measurement reports were transmitted to MN 120 before time instant X as shown in FIG. 5, or SN 130 if the measurement reports were transmitted to SN 130 before.

Moreover, UE 110 may determine that $P_{UL,MN}>P_{UL,SN}$ when t>X. In such a case, UE 110 may, responsive to the determination, determine that the measurement report associated with the transmission of MN 120 and the measurement report associated with the transmission of SN 130 should be transmitted to SN 130. As an example, UE 110 may be in EN-DC mode between a macro LTE eNB, such as MN 120, and an NR small cell, such as SN 130, and if UE 110 is in the proximity of the NR small cell, it may be beneficial to send LTE measurement report over the NR small cell.

In some embodiments, UE 110 may apply hysteresis when determining whether to transmit the measurement reports to MN 120 or SN 130. For instance, if the measurement reports have been transmitted to MN 120 before, i.e., MN 120 is the default BS, it may be required that $P_{UL,MN}>P_{UL,SN}+Y$, wherein Y is a threshold value for the hysteresis, for making a decision to start transmitting the measurement reports to SN 130. In addition, or alternatively, a penalty timer may be applied. The penalty timer may be used to define that the measurement reports need to be sent to the same destination for a while after a change. Thus, ping-ponging between MN 120 and SN 130 may be avoided.

Alternatively, or in addition, UE 110 may determine that an uplink transmission power associated with a selected RRC connection is above the threshold and responsive to the determination, UE 110 may transmit using the selected RRC connection without performing a reselection, i.e., without comparing the uplink transmission power associated with the selected RRC connection to uplink transmission powers associated with any other RRC connections.

With reference to FIG. 4 again, UE 110 may select, at step 424, a RRC connection for transmitting the measurement reports based on a required uplink transmission power to MN 120 and a required uplink transmission power to SN 130, e.g., upon comparing the calculated uplink transmission power to MN 120 to the calculated uplink transmission power to SN 130. After selecting the RRC connection for transmitting the measurement reports, UE 110 may transmit, using the selected RRC connection, a measurement report associated with the transmission of MN 120 and a measurement report associated with the transmission of SN 130.

If the required uplink transmission power to MN 120 was determined as lower than the required uplink transmission power to SN 130 at step 424, UE 110 may, at step 426a, transmit the measurement reports to MN 120. In some embodiments, the transmitted measurement reports may comprise the measurement report associated with the transmission of SN 130. MN 120 may, at step 428a, determine that a received measurement report, or a part of it, was not addressed to it. In such a case, MN 120 may forward the measurement report associated with the transmission of SN 130 to SN 130.

Similarly, If the required uplink transmission power to SN 130 was determined as lower than the required uplink transmission power to MN 120 at step 424, UE 110 may, at step 426b, transmit to SN 130 the measurement reports. In some embodiments, the transmitted measurement reports may comprise the measurement report associated with the transmission of MN 120. SN 130 may, at step 428b, determine that a received measurement report, or a part of it, was not addressed to it. In such a case, SN 130 may forward the measurement report associated with the transmission of MN 120 to MN 120. In general, it may be assumed that UE 110, when preparing a measurement report, may take into account the intended BS, such as MN 120 or SN 130, e.g., to apply ciphering etc.

In some embodiments, a network may make the decision and inform UE 110 about the most power efficient radio link, i.e., RRC connection, by transmitting an indication. With reference to FIG. 4 again, the two radio links towards MN 120 and SN 130 may have independent power control after setting up the dual connectivity at step 410. Even though the network may control uplink transmission powers of UE 110, the network may not have information on the absolute transmit power levels of UE 110. For instance, the network may utilize a power headroom report of UE, e.g., to evaluate whether UE 110 is close to its maximum transmit power capability. Another indication about a transmit power level of UE 110 may be path loss. Alternatively, or in addition, UE 110 may report its absolute transmit power for each RRC connection.

MN 120 may not have information about an uplink transmission power that is used for transmitting to SN 130 while SN 130 may not have information about an uplink transmission power that is used for transmitting to MN 120. Consequently, MN 120 and SN 130 may need to retrieve uplink transmit power indicators from each other, e.g., over a X2 or Xn air interface.

In some embodiments, if SN 130 informs MN 120 about absolute transmit powers, power headroom and/or path loss between UE 110 and SN 130, MN 120 may make the decision about the most power efficient link by comparing the received information with information about uplink transmission power used by UE 110 to transmit to MN 120. The decision may then be transmitted to UE 110, e.g., as a part of its RRC configuration. Thus, in some embodiments, the network may select the RRC connection to be used for transmitting measurement reports, by exploiting information acquired over X2 or Xn for example.

Alternatively, the network may select the RRC connection to be used for transmitting measurement reports based on a chosen primary data link in uplink for user-plane, e.g., based on conditions of the network. For instance, UE 110 may be instructed to make a primary leg for split SRB to be the same as the primary leg for split Data Radio Bearer, DRB. In addition, in some embodiments, the network may define some rules for UE 110 so that UE 110 may determine a control plane leg, based on a link using a lower carrier frequency for example. In general, the primary data link in uplink, i.e., the primary leg, may be referred to as a primary RRC connection used for uplink transmissions. In some embodiments, UE 110 may determine that an uplink transmission power associated with the primary RRC connection is above a threshold and responsive to the determination, UE 110, may select the primary RRC connection and transmit using the primary RRC connection without performing a comparison, e.g., without comparing the uplink transmission power associated with the primary RRC connection to uplink transmission powers associated with any other RRC connections.

In some embodiments, a measurement report received from UE 110 may be transmitted from MN 120 to SN 130, or vice versa, using an RRC transfer procedure. If the BS that receives the measurement report, such as SN 130, is not the final destination of the measurement report, such as MN 120, SN 130 may forward the measurement report associated with a transmission of MN 120 to MN 120, e.g., over a X2 or Xn. The forwarding may incur some additional delay, but typically the delay is negligible, e.g., in the order of a few microseconds per kilometre. Nevertheless, such a delay may be intolerable in some cases and thus the network, such as MN 120 or SN 130, may configure a masking for the measurement reports for which UE 110 may not use this scheme. That is to say, MN 120 or SN 130 may configure UE 110 to transmit measurement reports to a single destination only in some cases, but not all. For instance, MN 120 or SN 130 may configure UE 110 to avoid transmitting measurement reports to a single destination, i.e., to avoid forwarding of the measurement reports, for measurement events intended for controlling a handover procedure because of critical time requirements.

In some embodiments, RRM measurement reports towards MN 120 and SN 130 may be combined to a single RRC message. That is to say, a measurement report associated with a transmission of MN 120 and a measurement report associated with a transmission of SN 130 may be combined to a single RRC message. For instance, the measurement reports may be combined if periodic measurement reporting is used.

In addition, or alternatively, a maximum delay window may be used. UE 110 may wait, or create, other measurement reports during the maximum delay window and then combine all the measurement reports to a single RRC message. In some embodiments, the maximum delay window may be configured by the network.

Embodiments of the present invention therefore enable power efficiency of UE 110 for providing measurement reports by utilizing the most power efficient link, i.e., RRC connection, for transmitting measurement reports. Also, in some embodiments, the measurement reports may be combined to achieve even more power efficient operation. Thus, control plane signalling may be reduced in uplink. In addition, uplink interference levels may be reduced as well, thereby providing advantages on the system level.

Figure 6:
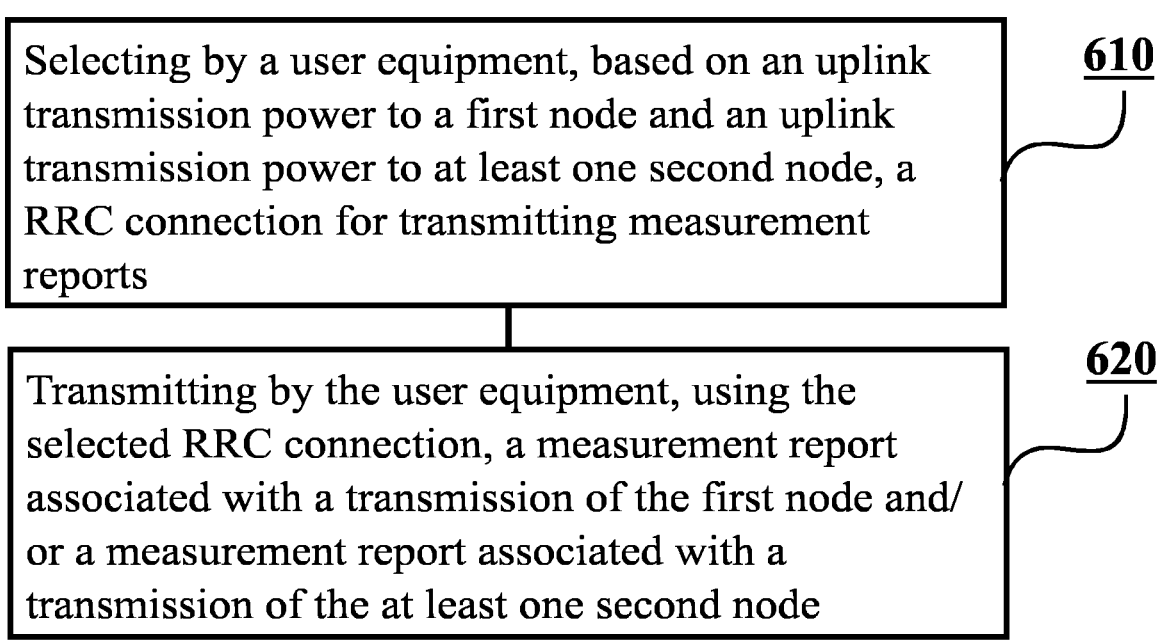
FIG. 6 illustrates a flow graph of a first method in accordance with at least some embodiments.

FIG. 6 is a flow graph of a first method in accordance with at least some embodiments. The phases of the illustrated first method for multi-connectivity may be performed by UE 110, or by a control device configured to control the functioning thereof, possibly when installed therein.

The first method for multi-connectivity may comprise, at step 610, selecting by a user equipment, based on an uplink transmission power to a first node and an uplink transmission power to at least one second node, a Radio Resource Control, RRC, connection for transmitting measurement reports. The first method may also comprise, at step 620, transmitting by the user equipment, using the selected RRC connection, a measurement report associated with a transmission of the first node and/or a measurement report associated with a transmission of the at least one second node.

Figure 7:
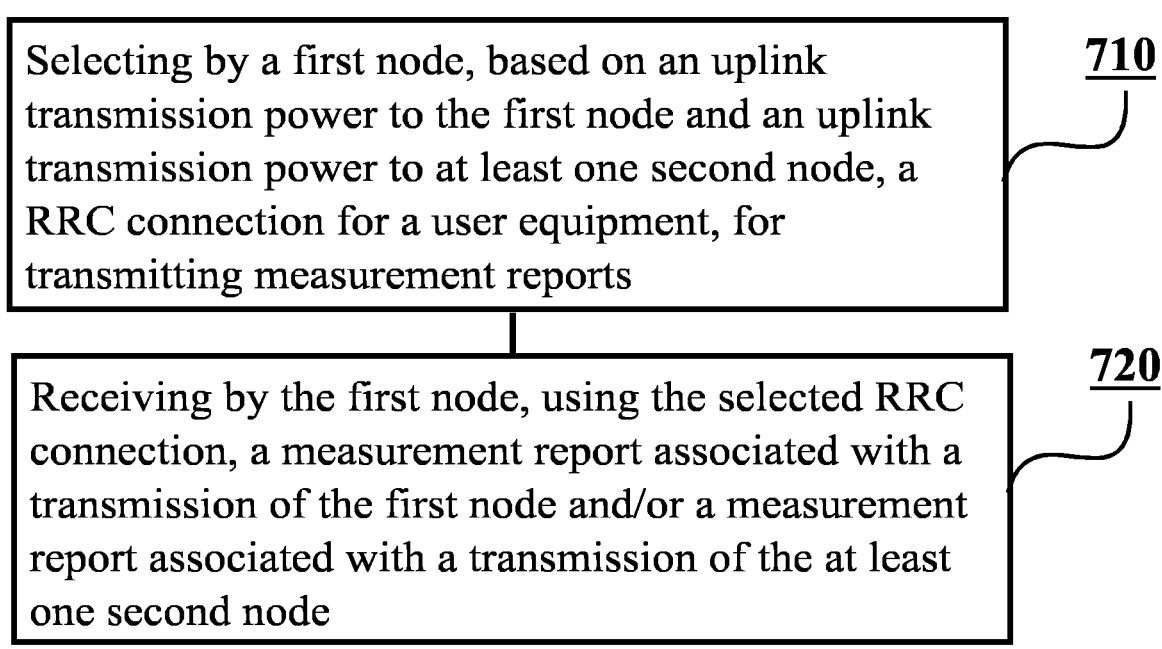
FIG. 7 illustrates a flow graph of a second method in accordance with at least some embodiments.

FIG. 7 is a flow graph of a second method in accordance with at least some embodiments. The phases of the illustrated second method for multi-connectivity may be performed by MN 120, or by a control device configured to control the functioning thereof, possibly when installed therein.

The second method for multi-connectivity may comprise, at step 710, selecting by a first node, based on an uplink transmission power to the first node and an uplink transmission power to at least one second node, a Radio Resource Control, RRC, connection for a user equipment, for transmitting measurement reports. The second method may also comprise, at step 720, receiving by the first node, using the selected RRC connection, a measurement report associated with a transmission of the first node and/or a measurement report associated with a transmission of the at least one second node.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or MN 120, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, UE 110 or MN 120, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments find industrial application in cellular communication networks, wherein it is desirable to enable power-efficient reporting of measurements when dual connectivity is used. More specifically, at least some embodiments find industrial application in 5G/NR networks. For instance, embodiments of the present invention may be applied for 3GPP RAN Rel-16 standardization.

ACRONYMS LIST

3GPP 3rd Generation Partnership Project
ASIC Application-Specific Integrated Circuit
BS Base Station
DRB Data Radio Bearer
DRX Discontinuous Reception
EN-DC MR-DC with EPC
EPC Evolved Packet Core
FPGA Field-Programmable Gate Array
GSM Global System for Mobile communication
IoT Internet of Things
LTE Long-Term Evolution
M2M Machine-to-Machine
MCG Master Cell Group
MN Master Node
MR-DC Multi-RAT Dual Connectivity
NFC Near-Field Communication
NR New Radio
NR-DC NR-NR Dual Connectivity
PDU Protocol Data Unit
PUCCH Physical Uplink Control Channel
PUSCH Physical Uplink Shared Channel
RAT Radio Access Technology
RRC Radio Resource Control
RRM Radio Resource Management
RS Reference Signal
RSRP Reference Signal Received Power
RSRQ Reference Signal Received Power
SCG Secondary Cell Group
SIM Subscriber Identity Module
SN Secondary Node
SRB Signaling Radio Bearer
SRI SRS Resource Indicator
SRS Sounding Reference Signal
UE User Equipment
UI User Interface
WCDMA Wideband Code Division Multiple Access
WiMAX Worldwide Interoperability for Microwave Access
WLAN Wireless Local Area Network

| REFERENCE SIGNS LIST | |
|---|---|
| 110 | User Equipment |
| 115, 125, 135, 145 | Interfaces |
| 120 | Master Node |
| 130 | Secondary Node |
| 140 | Core network |
| 300-370 | Structure of the apparatus of FIG. 3 |
| 410-428b | Steps in the signaling graph of FIG. 4 |
| 610-620 | Phases of the first method in FIG. 6 |
| 710-720 | Phases of the second method in FIG. 7 |

The invention claimed is:

1. A method for power saving in multi-connectivity, comprising:
 selecting by a user equipment, based on an uplink transmission power to a first node and an uplink transmission power to at least one second node, a Radio Resource Control, RRC, connection for transmitting measurement reports, wherein the user equipment compares the uplink transmission power of the first node to the uplink transmission power of the at least one second node and selects the RRC connection for transmitting to the at least one second node wherein the uplink transmission power for the first node is greater than the uplink transmission power of the at least one second node plus a hysteresis threshold, and wherein the user equipment starts a timer such that measurement reports are sent to the at least one second node at least until expiration of the timer, wherein the selecting further includes:
 calculating the uplink transmission power to the first node;
 calculating the uplink transmission power to the at least one second node; and
 wherein the selecting further comprises comparing the calculated uplink transmission power to the first node and the calculated uplink transmission power to the at least one second node; and
 transmitting by the user equipment, using the selected RRC connection, a measurement report associated with a transmission of the first node and/or a measurement report associated with a transmission of the at least one second node.

2. The method according to claim 1, wherein the selecting further comprises selecting between an RRC connection to the first node and an RRC connection to the at least one second node.

3. The method according to claim 1, wherein the selected RRC connection comprises at least one Signaling Radio Bearer, SRB.

4. The method according to claim 1, further comprising:
 determining that the uplink transmission power associated with the selected RRC connection is above a threshold; and
 responsive to the determination, transmitting using the selected RRC connection.

5. The method according to claim 1, further comprising:
 determining that the uplink transmission power associated with a primary RRC connection is above a threshold; and responsive to the determination, selecting the primary RRC connection and transmitting using the primary RRC connection.

6. The method according to claim 1, further comprising:
determining that the uplink transmission power to the at least one second node is lower than, or lower by a threshold than, the uplink transmission power to the first node; and
responsive to the determination, transmitting to the at least one second node the measurement report associated with a transmission of the first node.

7. The method according to claim 1, further comprising:
applying a penalty timer, wherein the penalty timer defines a time period during which the selected RRC connection is to be used; and
upon expiry of the penalty timer, enabling reselection of the RRC connection for transmitting measurement reports.

8. The method according to claim 1, further comprising:
determining that the uplink transmission power to the first node is lower, or lower by a threshold, than the uplink transmission power to the at least one second node; and
responsive to the determination, transmitting to the first node the measurement report associated with a transmission of the at least one second node.

9. The method according to claim 1, wherein the measurement report associated with the transmission of the first node and the measurement report associated with the transmission of the at least one second node are embedded to a single RRC message by the user equipment.

10. The method according to claim 1, wherein the first node is a master node and the at least one second node is a secondary node.

11. An apparatus comprising at least one processing core, at least one memory including computer program code, the at least one memory and the computer program code being configured to, with the at least one processing core, cause the apparatus at least to perform:
select, by a user equipment, based on an uplink transmission power to a first node and an uplink transmission power to at least one second node, a Radio Resource Control, RRC, connection for transmitting measurement reports, wherein the user equipment compares the uplink transmission power of the first node to the uplink transmission power of the at least one second node and selects the RRC connection for transmitting to the at least one second node wherein the uplink transmission power for the first node is greater than the uplink transmission power of the at least one second node plus a hysteresis threshold, and wherein the user equipment starts a timer such that measurement reports are sent to the at least one second node at least until expiration of the timer, wherein the selecting further includes the user equipment:
calculating the uplink transmission power to the first node;
calculating the uplink transmission power to the at least one second node; and
wherein the selecting further comprises comparing the calculated uplink transmission power to the first node and the calculated uplink transmission power to the at least one second node; and
transmit, by the user equipment, using the selected RRC connection, a measurement report associated with a transmission of the first node and/or a measurement report associated with a transmission of the at least one second node.

* * * * *